June 19, 1934.   W. B. WINGERT   1,963,516
PROCESS FOR THE RECOVERY OF PHENOLS FROM GAS LIQUORS
Filed May 20, 1931   2 Sheets-Sheet 1
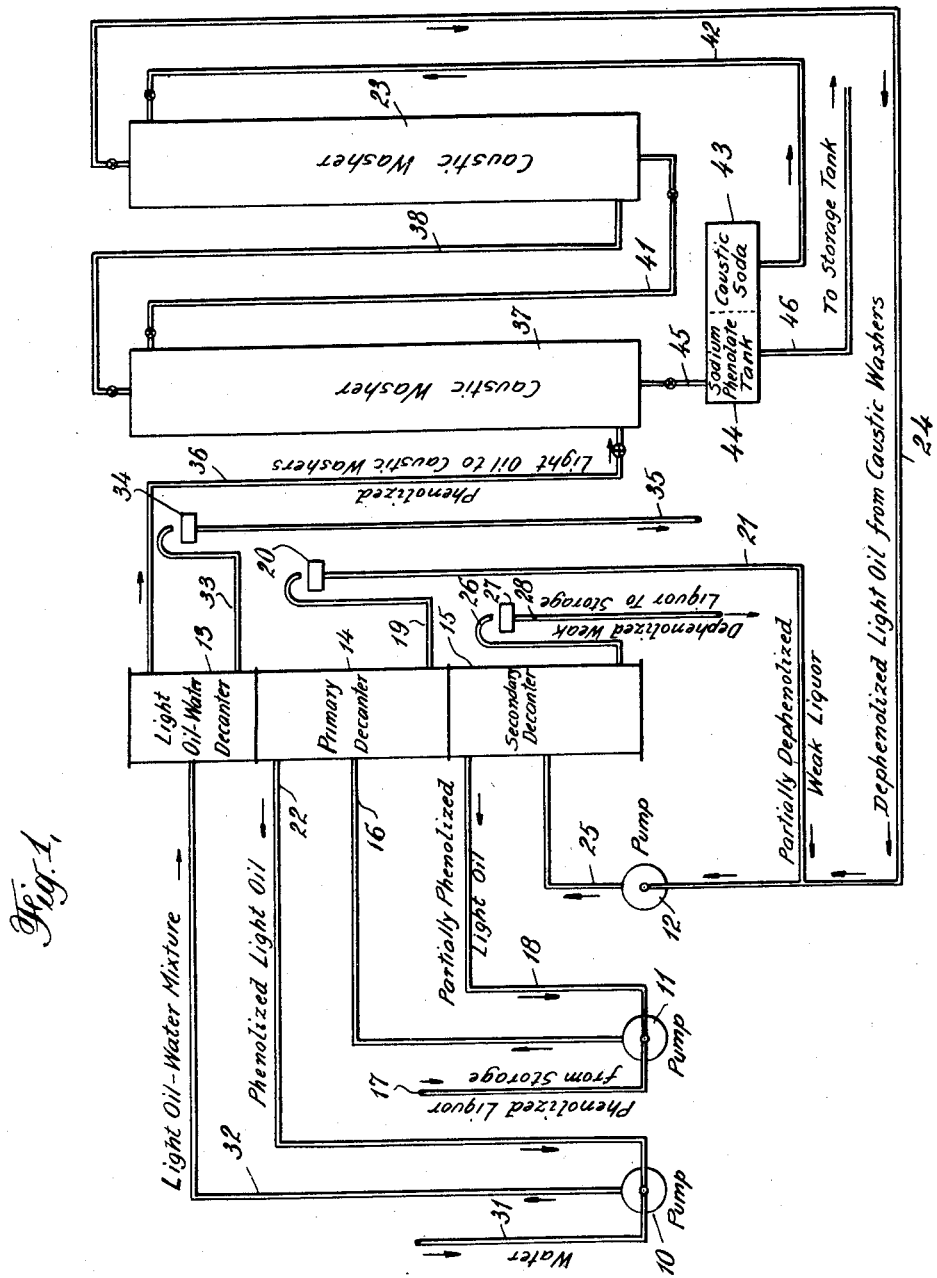
INVENTOR
William B. Wingert
BY
ATTORNEY

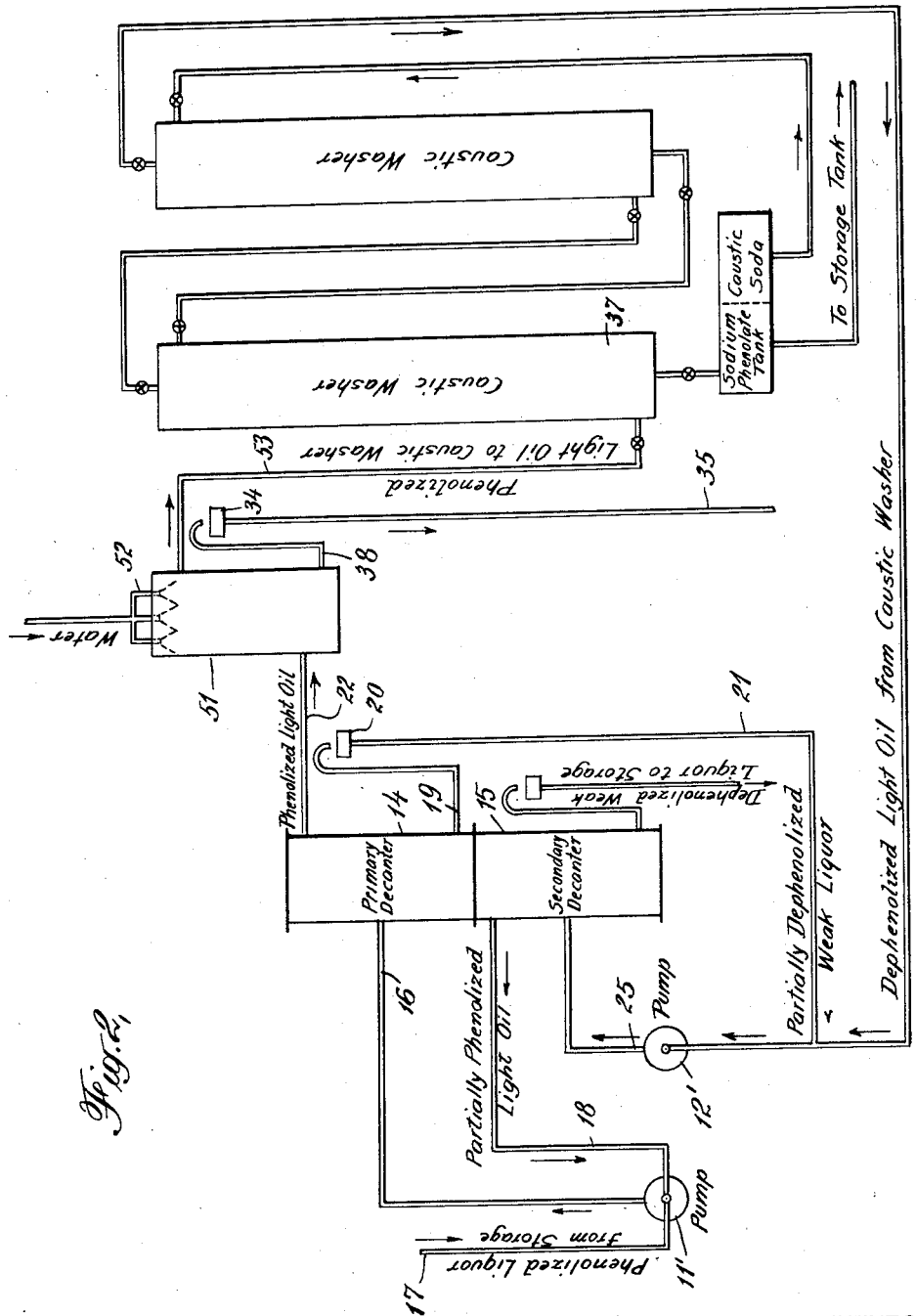

Patented June 19, 1934

1,963,516

UNITED STATES PATENT OFFICE 1,963,516

PROCESS FOR THE RECOVERY OF PHENOLS FROM GAS LIQUORS

William B. Wingert, New York, N. Y., assignor to Semet-Solvay Engineering Corporation, New York, N. Y., a corporation of New York Application May 20, 1931, Serial No. 538,739

4 Claims. (Cl. 260—154)

This invention relates to a process and apparatus for recovering organic compounds from waste liquors, and more particularly, to the removal and recovery of tar acids, such as phenols, from weak and waste liquors of coke oven plants and gas works. The invention herein is in the nature of an improvement over my invention disclosed in co-pending application Serial No. 415,831, filed December 21, 1929.

As pointed out in my prior application, Serial No. 415,831, it has been proposed to treat weak ammoniacal and gas liquors containing phenols and other constituents with inert organic solvents, such as light oil, neutral tar oils, or benzol, to extract the phenols therefrom. The solvent dissolves the phenols in the liquors, and being immiscible with the liquor, readily separates from the liquor. The phenolized solvent or extracting medium separated from the liquor has then been treated with caustic solution, which converts the phenols into water soluble sodium phenolates. Thus, the phenolic extracting medium has the phenols removed therefrom and may be re-used to recover additional phenols from the liquor.

Gas and ammoniacal liquors, among other constituents, contain hydrogen sulfide and carbon dioxide, which, it has been found, are taken up by the extracting medium. Upon subsequent treatment of the extracting medium with caustic, the hydrogen sulfide and carbon dioxide contained in the extracting medium react with the caustic and materially increase the amount of caustic necessary to effect the removal of the phenols from the solvent oil.

In accordance with my invention, disclosed and claimed in my co-pending application Serial No. 415,831, hereinabove referred to, the light oil, or other extracting medium containing phenols, carbon dioxide and hydrogen sulfide, removed from the gas liquor, is first scrubbed with water to remove the carbon dioxide and hydrogen sulfide therein, and thereafter the phenols recovered from the extracting medium by treatment with caustic or in any other desired manner. The effect of this washing operation may possibly be explained on the theory that the solubility of the phenols in organic hydrocarbon solvents appears to be much greater than in water, while the reverse appears to be true for the major impurities, such as hydrogen sulfide and carbon dioxide present in the phenol solvent mixture.

Weak gas and ammoniacal liquors containing small amounts of tar acids, ammonia, carbon dioxide, hydrogen sulfide, and other constituents produced in the normal operation of coke ovens and gas plants have been passed through scrubbing towers in parallel flow or in counter-current relation with a suitable inert organic solvent or extracting medium, such as light oil, the extracting medium absorbing the phenols or tar acids from the waste liquors. The light oil used in this process may be the unrefined oil obtained at the coke oven plant by treating the gas distillate with a suitable absorbing medium, such as straw oil, and thereafter distilling the resultant benzolized oil to obtain the crude light oil containing benzol, toluol, xylene, and a small fraction of unsaturated compounds such as olefines and other constituents.

I have found that the efficiency of the phenol recovery system can be greatly increased by passing weak liquors containing phenols, carbon dioxide, hydrogen sulfide and other constituents, together with a suitable extracting medium, such as light oil, into a centrifugal pump wherein the liquor and light oil are vigorously agitated and the resultant mixture pumped into a decanter by the pump. In the decanter the light oil, which has absorbed phenols, carbon dioxide, and hydrogen sulfide and other impurities, separates as the upper layer from the lower liquor layer. The light oil is withdrawn from the decanter and treated to remove carbon dioxide, hydrogen sulfide, and other impurities therefrom, while retaining the phenols. Preferably, in accordance with my invention, this removal is accomplished by introducing the phenolic light oil, together with water or other liquid absorbing medium for carbon dioxide and hydrogen sulfide, into a second centrifugal pump, wherein the phenolic light oil and the water are vigorously agitated and then pumped into a second decanter. In this decanter the lower water layer, containing the carbon dioxide and hydrogen sulfide, separates from the upper light oil layer containing phenols. The phenolic light oil is withdrawn and treated as usual with caustic to form sodium phenolate and separates from the light oil, thus purifying the oil and conditioning it for re-use to recover phenols from the incoming liquor to the system.

In accordance with the preferred embodiment of this invention, three decanters, which may be arranged in superposed relation, and three centrifugal pumps, suitably connected to the decanters, may be utilized. Phenolic liquor, at a temperature of from 20° to 65° C. before distillation to remove ammonia therefrom, also containing other constituents and light oil, which has been contacted with partially dephenolized liquor in a subsequent step, are continuously introduced into the first pump, vigorously agitated therein, and pumped into the primary decanter. Here the light oil containing phenols and other constituents separates from the lower partially dephenolized liquor. Approximately 75% to 85% of the phenols contained in the liquor, it has been found, may be removed in the first pump. The partially dephenolized liquor, together with fresh or purified light oil, is passed into the second pump and vigorously agitated therein and then pumped therefrom into the second decanter. Substantially the remainder of the phenols in the liquor may be removed in the second pump. The light oil layer of the second decanter, as above indicated, is passed into the first pump. The lower liquor layer, which contains substantially no phenols, is withdrawn from the second decanter and may be treated to recover other constituents.

The light oil from the primary decanter, containing phenols, carbon dioxide, hydrogen sulfide, and other constituents, together with water, is introduced into the third centrifugal pump, vigorously agitated therein, and discharged therefrom into the third decanter. In this decanter the lower water layer containing the carbon dioxide, hydrogen sulfide, and other water soluble impurities separates from the upper phenolic light oil layer. The upper layer is withdrawn from this decanter and passed through caustic washers to recover the phenols and purify the light oil, which may be pumped from the caustic washers to the second centrifugal pump.

In the accompanying drawings, illustrating preferred embodiments of my invention, Fig. 1 is a view, somewhat diagrammatic, showing the preferred arrangement of the apparatus for practicing this invention.

Fig. 2 is a view somewhat diagrammatic of a similar arrangement of apparatus in which a scrubber is utilized for the removal of carbon dioxide and hydrogen sulfide from the phenolized light oil instead of the centrifugal pump apparatus of Fig. 1.

Referring to Fig. 1, reference numerals 10, 11 and 12 indicate three centrifugal pumps, which may be of any well known design, and accordingly, are shown diagrammatically on the drawings. Communicably connected to the pumps by pipe lines and in the relation hereinafter described are three decanters, 13, 14 and 15, which may be arranged in superposed relation, as shown in Fig. 1. Decanter 14 is the primary waste liquor, light oil decanter and is connected by pipe line 16 with the discharge outlet of pump 11. A liquor inlet line 17, which may be connected to a storage tank for waste or weak gas liquors or ammonia liquors, leads into the centrifugal pump 11. A light oil or other extracting medium feed line 18 connects the secondary decanter 15 with the pump 11. Partially phenolized light oil flows continuously from decanter 15 to pump 11 through pipe 18 and weak liquor containing phenols, carbon dioxide, hydrogen sulfide and other constituents is continuously introduced into pump 11 through pipe 17. The blades of the pump vigorously agitate the partially phenolized light oil and liquor and the resultant mixture is pumped through pipe 16 into the primary decanter 14. The flow of liquor and oil to the pumps is regulated so that the pumps operate at somewhat below their normal rated capacity. The proportion of liquor to oil fed into each pump varies in accordance with the phenol concentration of the liquors. Preferably, the amount of light oil introduced is greater than that of the liquor. A ratio of one volume of liquor to 1.25 volumes of light oil results in satisfactory extraction of the phenols from the liquor.

In the primary decanter 14, the mixture of phenolic light oil and partially dephenolized liquor stratify, the lower liquor layer passing out through pipe line 19 into an overflow device 20, which communicates with pipe line 21, leading into pump 12. The phenolic light oil leaves the top of the primary decanter 14 through pipe line 22, communicating with the centrifugal pump 10. The dephenolized or purified light oil is continuously pumped or otherwise passed from caustic washer 23 through pipe line 24, which leads into the centrifugal pump 12. In this pump, the partially dephenolized weak liquor from the primary decanter and the purified light oil are vigorously agitated and the mixture is discharged through pipe line 25 into substantially the mid portion of the secondary decanter 15. The now totally dephenolized liquor leaves the base of decanter 15 through pipe line 26 which communicates with overflow device 27 of the pipe line 28 which leads to a storage tank or suitable place of disposal for the weak liquor. The partially phenolized light oil leaves the top of the second decanter 15 through pipe line 18, which, as above described, is connected to the centrifugal pump 11.

Water or other solvent for carbon dioxide and hydrogen sulfide is introduced into centrifugal pump 10 through pipe line 31 and is vigorously agitated therein and admixed with the phenolized light oil which passes from the top of the primary decanter 14 through pipe line 22 into centrifugal pump 10. The resultant mixture is discharged through the pipe 32 which leads into the mid portion of the light oil and water decanter 13. In this decanter, water containing the carbon dioxide, hydrogen sulfide and other soluble impurities removed from the light oil separates as the lower layer, which continuously passes through line 33, communicating with the base of decanter 13. Pipe 33 discharges into overflow device 34, in turn connected with pipe line 35, which may lead to a point of disposal. The upper light oil layer containing phenols passes from decanter 13 through pipe line 36 into caustic washer 37.

The caustic washers 37 and 23, of usual design, contain bodies of caustic solution through which the light oil containing phenols passes and in so doing, the phenols are removed therefrom. Preferably the light oil is passed in series up through caustic washer 37, then through pipe line 38 into and through caustic washer 23, the dephenolized light oil leaving through pipe line 24, which communicates with the centrifugal pump 12. Valve controlled pipe line 41 connects the caustic washers 23 and 37 for the purpose of passing the caustic from tower 23 to tower 37 when desired. Fresh caustic may be introduced in tower 23 after the caustic therein is spent, through pipe line 42, which communicates with a source of caustic 43 and the top of tower 23. When the caustic in tower 37 has completely reacted with the phenols, it may be withdrawn into tank 44 through valve controlled pipe 45 and passed from this tank 44 into a storage tank or other point of disposal through pipe line 46.

In the embodiment of the invention shown in Fig. 2, two centrifugal pumps, 11' and 12', corresponding to the pumps 11 and 12 of Fig. 1, are utilized. A scrubbing tower 51 is substituted for the decanter 13 and connected centrifugal pump 10 of Fig. 1. Phenolized light oil from primary decanter 14 passes through pipe 22 into the base of scrubber 51 and rises up through the body of liquor therein. Water or other solvent for carbon dioxide and hydrogen sulfide is introduced into tower 51 through a series of sprays 52, disposed at the top of the tower and arranged to form a fine mist or spray of water over substantially the entire surface of the liquid in this tower. The light oil continuously leaves the tower through pipe line 53, which communicates with the base of the caustic washer 37. Liquid containing carbon dioxide, hydrogen sulfide and other impurities from the light oil passes through pipe 33 communicating with the base of tower 51 into the overflow device 34, and by means of pipe 35 is conveyed to a suitable point of disposal.

The centrifugal pump and decanter apparatus of the invention operate continuously, streams of liquor and oil flowing through the pipe lines continuously into the pump and discharged thereby into substantially the mid portion of the decanter, the extracting oil, immiscible with the liquor, rising to the top and flowing out through the discharge line at the top of each decanter and the liquor settling to the bottom and continuously withdrawn therefrom. In practice it is found that the centrifugal pump apparatus is more compact, takes up less ground space and operates more efficiently to treat gas liquors to remove and recover phenols therefrom.

It has also been found that phenols can be removed with the centrifugal pump apparatus of this invention and light oil containing phenols, hydrogen sulfide and carbon dioxide treated to remove the hydrogen sulfide and carbon dioxide while retaining the phenols with greater efficiency than prior existing processes, for example: In accordance with one example of the invention, 125,000 gallons of light oil, contacts with 100,000 gallons of weak liquor. The weak liquor contains 3.2 grams of phenol, 2.4 grams of hydrogen sulfide, and 3.8 grams of carbon dioxide per liter of liquor. The dephenolized liquor coming from the second decanter contains only .13 grams of phenol per liter of liquor, a percentage recovery of 96%, based on the total phenol content of the liquor. The phenolized light oil entering the washer 13 contains 2.66 grams of phenol, .07 grams of hydrogen sulfide, and .02 grams of carbon dioxide per liter of liquor, and the phenolized light oil upon leaving the washer contains 2.57 grams of phenol, .02 grams of hydrogen sulfide, and .006 grams of carbon dioxide per liter of liquor. This represents a saving of 141.6 pounds of sodium hydroxide for each 100,000 gallons of liquor treated since 202 pounds of sodium hydroxide would be consumed by the hydrogen sulfide and carbon dioxide if the phenolized light oil is not washed to removed hydrogen sulfide and carbon dioxide therefrom, and due to the washing operation, the hydrogen sulfide and carbon dioxide content is reduced so that only 60.4 pounds of sodium hydroxide are consumed for every 100,000 gallons of liquor by the residual hydrogen sulfide and carbon dioxide in the light oil.

It will, of course, be understood that while specific embodiments of the invention have been described, various changes in the details thereof might be made by those skilled in the art, this invention is not to be limited by the description herein but only by the scope of the appended claims.

I claim:
1. The process of treating gas liquors containing phenols, hydrogen sulfide, and carbon dioxide to remove phenols therefrom which comprises vigorously agitating the liquor with an inert organic solvent, separating the solvent containing phenols, hydrogen sulfide and carbon dioxide from the liquor, treating the solvent to remove hydrogen sulfide and carbon dioxide therefrom and thereafter treating the resultant solvent with alkali to remove the phenols therefrom in the form of alkali phenolates.

2. The process of extracting liquor containing phenols, carbon dioxide and hydrogen sulphide, which comprises vigorously agitating said liquor with an inert organic solvent immiscible with the liquor, thereafter permitting the resultant mixture to stratify into a liquor layer and a solvent layer containing the phenols, carbon dioxide and hydrogen sulphide, separating the liquor layer from the solvent layer, treating the solvent layer to remove the carbon dioxide and hydrogen sulphide therefrom without removing the phenols, thereafter treating the solvent layer containing the phenols with alkali to form alkali phenolate, and separating the alkali phenolate from the solvent.

3. The process of extracting liquor containing phenols, carbon dioxide and hydrogen sulphide, which comprises vigorously agitating light oil and said liquor, permitting the resultant mixture to stratify into a liquor layer and a light oil layer, separating the liquor from the light oil containing phenols, carbon dioxide and hydrogen sulphide, vigorously agitating the light oil containing phenols, carbon dioxide and hydrogen sulphide with water, permitting the resultant mixture to stratify into an aqueous layer containing carbon dioxide and hydrogen sulphide, and a light oil layer containing phenol, separating the light oil containing phenols from the aqueous layer, treating the light oil containing the phenols with alkali to form alkali phenolate, and separating the alkali phenolate from the light oil.

4. The process of treating gas liquors containing phenols, carbon dioxide and hydrogen sulphide to remove phenols therefrom, which comprises, passing streams of said gas liquors and an inorganic extracting medium for the phenols continuously into a centrifugal pump to vigorously agitate the resultant mixture, permitting the resultant mixture discharged from the pump to stratify into an extracting medium layer containing the phenols, carbon dioxide, and hydrogen sulphide and a liquor layer, separating the two layers, treating the phenolized extracting medium to remove hydrogen sulphide and carbon dioxide absorbed thereby while retaining the phenols in said extracting medium, and thereafter treating the extracting medium with alkali to remove the phenols therefrom in the form of alkali phenolates.

WILLIAM B. WINGERT.